March 26, 1968    W. P. BANKS ET AL    3,375,183

APPARATUS FOR MINIMIZING CORROSION OF METALS

Filed Sept. 23, 1964    2 Sheets-Sheet 1

INVENTORS
WILLIAM P. BANKS &
MERLE HUTCHISON
BY
William J. Miller
ATTORNEY

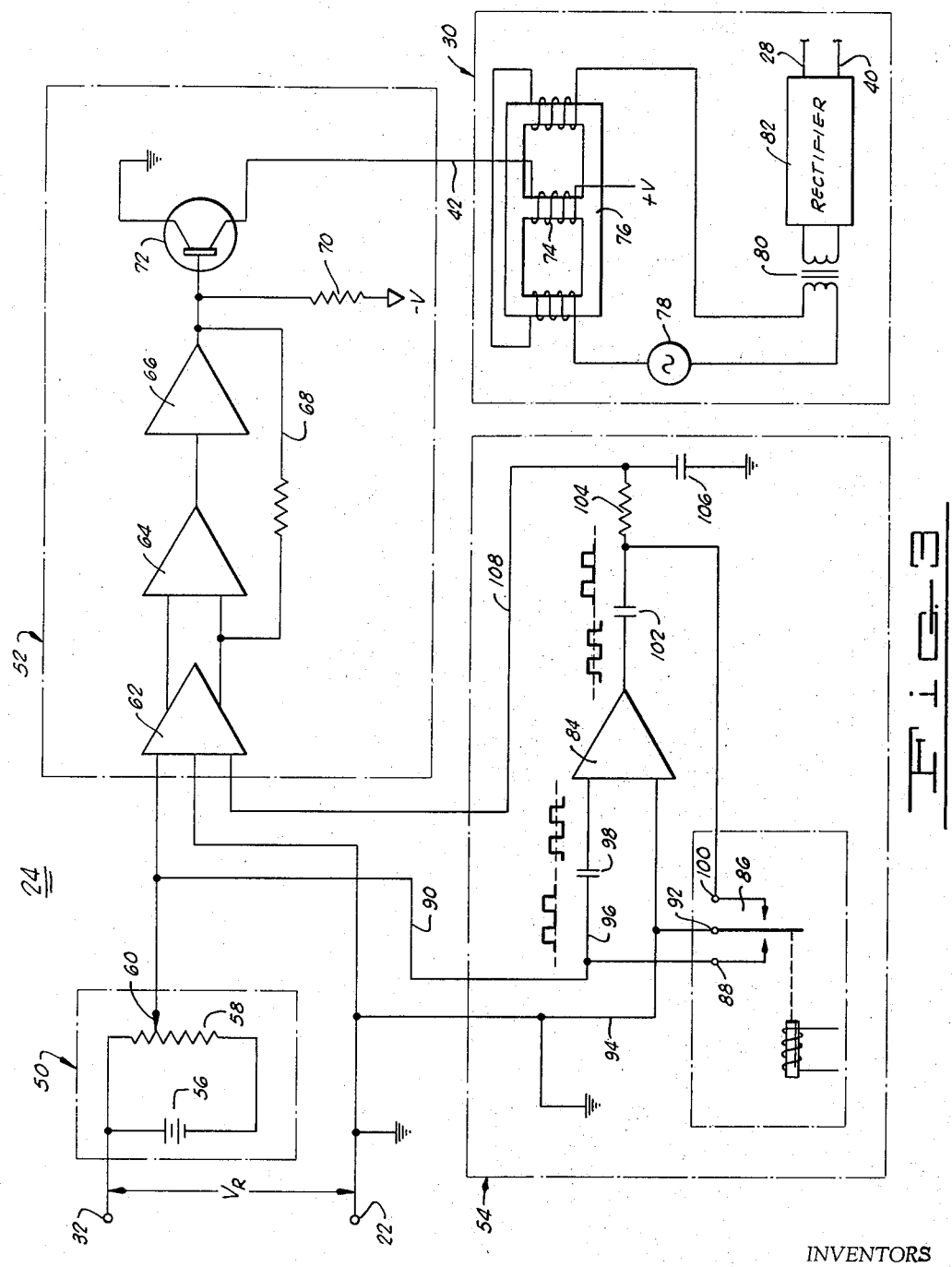

United States Patent Office 3,375,183
Patented Mar. 26, 1968

3,375,183
APPARATUS FOR MINIMIZING CORROSION
OF METALS
William P. Banks and Merle Hutchison, Ponca City,
Okla., assignors to Continental Oil Company, Ponca
City, Okla., a corporation of Delaware
Filed Sept. 23, 1964, Ser. No. 398,597
1 Claim. (Cl. 204—196)

ABSTRACT OF THE DISCLOSURE

A method for anodically passivating a vessel containing a corrosive electrolyte without the necessity of utilizing a reference electrode except for the period of time in which a polarization curve is obtained. When obtaining the polarization curve, the potential between the cathode and the vessel is monitored to pick out the passive range of the vessel. The cathode is then connected directly to the controller and the controller is set to control the potential within the passive region.

This invention relates generally, as indicated, to the art of minimizing corrosion of metals. More particularly, but not by way of limitation, the invention relates to a method and apparatus for anodically passivating a metal vessel containing a corrosive electrolytic solution.

As it is well known in the art of corrosion control, the corrosion of many metals may be prevented or largely reduced by inducing passivity in the metal by anodic polarization techniques. Recently, a method and apparatus for corrosion prevention by means of anodic polarization has been developed wherein a metallic specimen, such as a vessel to be protected against corrosion by a chemical contained therein, is anodically polarized with respect to an inert electrode suspended in the corrosive electrolyte in the vessel. An electrical current is passed between the metallic vessel and the inert cathode in a manner such as to maintain the electrical potential of the vessel in a so-called passive region, that is, a potential range in which the rate of corrosion of the vessel is minimized. The magnitude of the current which is applied between the vessel and the inert cathode is at all times determined by the potential of the metallic vessel, with the current being varied as necessary in order to maintain the potential of the vessel in the region of passivity. The electrical potential values at which the vessel is least susceptible to corrosion when subjected to contact with a particular electrolyte at a particular concentration and temperature may be determined by developing a polarization curve characteristic of the metal when the metal is in contact with the particular electrolyte at such temperature. The polarization curve is, of course, a curve in which the potential difference between the vessel and a reference electrode of constant potential is plotted against current density. The passive region on an anodic polarization curve can be easily identified and provides data indicative of the potential range within which the vessel should be maintained in order to achieve a maximum reduction in corrosion.

In the commercial systems which have been developed for protecting a metallic member by anodic polarization procedures, a reference electrode of constant potential is placed in electrical communication with the corrosive electrolyte contacting the metallic member, and the potential difference between such reference electrode and the metallic member is constantly monitored. This potential difference, which may be termed the reference potential, $V_r$, is constantly compared electrically with a second potential called the control potential, $V_c$. The control potential $V_c$ is the potential difference which, according to polarization curve data, must exist between the metallic member and the reference electrode if the vessel is to be maintained in a passive state. The continuous electrical comparison of the reference potential $V_r$ with the control potential $V_c$ results in a continuous generation of an error voltage $V_e$ which provides a signal usable to increase or decrease the amount of current passed between the metallic member and the inert cathode suspended in the electrolyte. In other words, the reference potential $V_r$ is constantly monitored, and the anodic corrosion control system functions to develop an error signal in the manner described to constantly maintain the metallic member at a passive potential.

As indicated, the commercial anodic passivation systems which have heretofore been in use have required the continuous use of a reference electrode in order to provide a reference potential. Such systems have been found to be commercially successful and a substantial step forward in the corrosion control art. However, the provision of a reference electrode is an expensive procedure, and the most popular reference electrodes are rather sensitive to environmental conditions and thus must be protected from the corrosive electrolytic solution.

The present invention contemplates a novel method and apparatus for anodically passivating a vessel containing a corrosive electrolytic solution without the necessity of utilizing a reference electrode. In the present system, the inert electrode used for passing anodic current through the corrosive solution is used, with the vessel, to provide a continuous reference potential, from which the amount of anodic current passed between the vessel and the cathode may be controlled.

In the method of this invention, the polarization curve for the vessel is first obtained, from which the passive range of the vessel may be determined. When obtaining the polarization curve in the manner set forth above, the potential between the cathode and the vessel is monitored to pick out the range of potential difference between these two members coinciding with the passive range of the vessel. The control potential $V_c$ in the controller may then be set in this potential range and the vessel and the cathode connected directly to the controller. The controller then monitors the difference in potential ($V_r$) between the cathode and the vessel and controls the current supply accordingly. It is, thus, only necessary to use a reference electrode when determining the polarization curve for the particular vessel under consideration, and such use may be confined to a laboratory.

An object of this invention is to provide a method of minimizing corrosion of a metal member which requires the minimum of equipment.

Another object of this invention is to provide an anodic passivation system which does not require the use of a reference electrode assembly.

A further object of this invention is to provide an anodic passivation system which is economical and requires a minimum of service.

Another object of this invention is to provide an anodic passivation system which is substantially free from adverse temperature and other environmental conditions.

A still further object of this invention is to provide a system for automatically passivating a vessel containing a corrosive electrolytic solution wherein the minimum openings in the vessel are required and passivity may be obtained over an extended period of time.

Other objects and advantages of the invention will be evident from the following detailed description when read in conjunction with the accompanying drawings which illustrate the invention.

In the drawings:

FIG. 3 is a more detailed wiring diagram of the controller and the current supply used in the system of FIG. 1.

Figure 1:
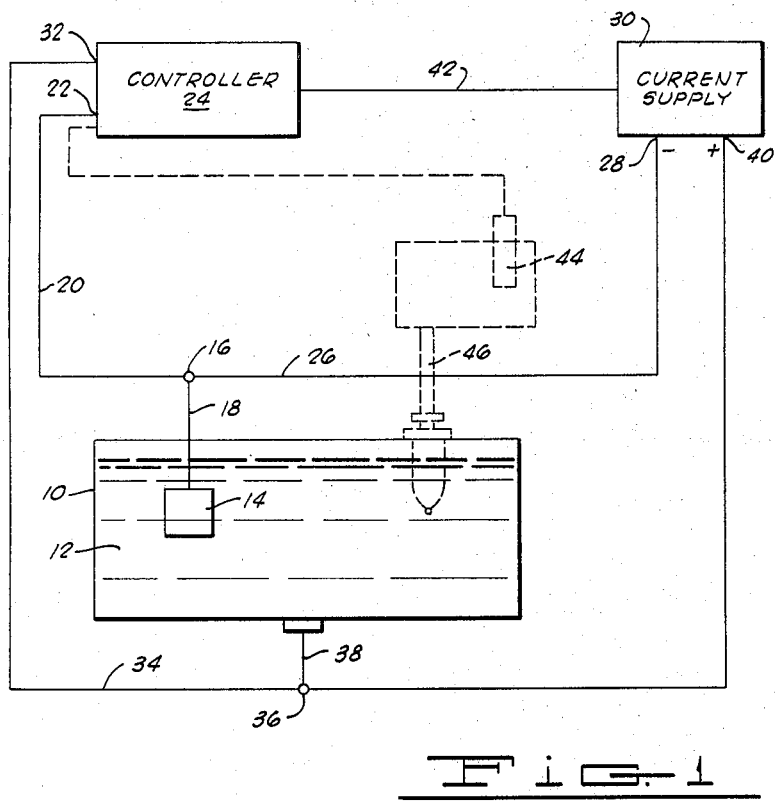
FIG. 1 is a schematic elevational view and block diagram of a system constructed in accordance with this invention.

Referring to the drawings in detail, and particularly FIG. 1, reference character 10 designates a metal vessel to be protected in accordance with the present invention from the corrosive action of a corrosive, electrolytic solution 12 contained in the vessel. The vessel 10 will frequently be stainless steel in view of the service conditions. The solution 12 may be any corrosive electrolyte, such as sulfuric acid, sodium hydroxide or the like.

An inert electrode 14 is suspended in the solution 12 and is connected to a junction 16 by a conductor 18. The electrode 14 functions as a cathode, as will be hereinafter more fully set forth, and may be constructed of any material which is inert to the solution 12 and resists changes in potential as a current is passed therethrough, that is, a material which does not polarize. In most instances, platinum has been found to be a suitable material of construction for the electrode 14. One conductor 20 extends from the junction 16 to one input 22 of a controller 24, and another conductor 26 extends from the junction 16 to one output terminal 28 of a DC current supply 30. The other input 32 of the controller 24 is connected to the vessel 10 through a conductor 34, junction 36 and conductor 38. Another conductor extends from the junction 36 to the other output terminal 40 of the current supply 30. It will thus be apparent that the controller 24 monitors the difference in potential between the electrode 14 and the vessel 10, and the controller 24 is connected to the current supply 30 by a conductor 42 to control the current being supplied to the vessel 10 and the electrode 14. The controller 24 and current supply 30 are shown in detail in FIG. 3 and will be discussed below.

Normally, a reference electrode 44 is placed in communication with the solution 12 and is connected to an input of the controller 24, in lieu of the conductor 20, in order that the controller 24 monitors the difference in potential between the reference electrode 44 and the vessel 10 to control operation of the current supply 30. As is well known, a reference electrode is normally sensitive to a corrosive solution, and is therefore normally connected to the corrosive solution 12 by means of a salt bridge 46 to make an expensive and rather sensitive installation. It will be understood that in the prior system as shown by the dashed lines in FIG. 1, the electrode 14 would be connected only to the current supply 30 and not to the controller 24.

METHOD

In accordance with the method of this invention, the passivity of the vessel 10 is first determined. This is normally determined by immersing a coupon of a material conforming to the material of the vessel 10 in a sample of the solution 12, along with a typical electrode such as the electrode 14 and a reference electrode 44. However, the method will be described in connection with an installation as illustrated in FIG. 1, with the exception that the reference electrode 44 is connected to the input 22 of the controller 24, and the electrode 14 is connected only to the current supply 30.

In determining passivity of the vessel 10, the potential of the vessel is varied in a direction to become what is known as more noble with respect to the reference electrode 44, and this is done by varying the setting of the controller 24 to in turn vary the potential difference between the vessel 10 and the electrode 14. It should also be noted that the current supply 30 is operated in such a manner that the vessel 10 is made an anode and the electrode 14 is made a cathode. During the variation of the potential between the vessel 10 and the electrode 14, the potential of the vessel 10 with respect to the reference electrode 44 is monitored, as is the amount of current passed between the vessel 10 and the electrode 14. Also, in accordance with the present invention, the potential difference between the vessel 10 and the electrode 14 is monitored by a suitable voltmeter (not shown).

Figure 2:
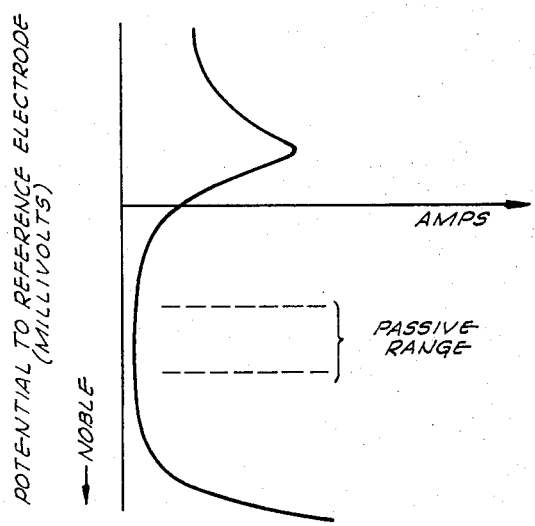
FIG. 2 is a typical polarization curve from which the passive range of a metal vessel may be obtained.

FIG. 2 may be considered a typical polarization curve obtained in the manner described when the potential of the vessel is varied all the way from a potential where the corrosion rate is relatively high, through a more passive range, and then to another increase in the corrosion rate. The amount of current shown on the curve is related to the corrosion rate. As will be observed in FIG. 2, there is a somewhat limited range of potentials between a reference electrode and the vessel corresponding to the most passive state for the vessel. In accordance with the present invention, this range of potentials can be also related to the potential between the cathode and the vessel during the time a particular polarization curve is being developed.

Table I sets forth the data obtained by such a passivity study on 1020 mild steel in 93 percent battery grade sulfuric acid at 80° F. It will be noted in the table that the density of the current between the vessel 10 and the electrode 14 dropped drastically at about +700 mv. potential between the vessel and the reference electrode and then stayed at a low value during the balance of the study, indicating that the vessel 10 was in a state of passivity. For this particular study it was not necessary to further increase the potential between the reference electrode and the vessel since the data clearly shows the passive range of the vessel to be when the vessel is more noble than +700 mv. and good passivity is obtained even when the nobility of the vessel is up to +1600 mv. In other words, the study was conducted only so far as was necessary to determine a practical passive range.

TABLE I.—ANODIC POLARIZATION DATA FOR 1020 MILD STEEL IN 93 PERCENT BATTERY GRADE SULFURIC ACID AT 80° F.

| Current Density, ma./sq. in., anodic | Applied DC Volts,[1] anodic | Potential,[2] mv. (noble) | Time, minutes |
|---|---|---|---|
| 0.47 | 0.1 | +100 | 3 |
| 0.47 | 0.2 | +200 | 3 |
| 0.47 | 0.3 | +300 | 3 |
| 0.47 | 0.4 | +400 | 3 |
| 0.80 | 0.5 | +500 | 3 |
| 1.17 | 0.7 | +580 | 3 |
| 0.6 | 0.8 | +700 | 3 |
| 0.19 | 0.9 | +800 | 3 |
| 0.12 | 1.0 | +1000 | 3 |
| 0.09 | 1.2 | +1200 | 3 |
| 0.08 | 1.5 | +1400 | 3 |
| 0.08 | 1.7 | +1600 | 3 |

[1] Between platinum cathode and vessel.
[2] Between vessel and saturated calomel reference electrode.

In further analyzing the data set forth in Table I, it will be observed that in the safe passive range of the vessel, the DC volts which were applied between the vessel 10 and the cathode 14 corresponded with the potential difference between the vessel and the reference electrode, however, we have found that this is not always the case. The voltage applied between the vessel 10 and the cathode 14 may be quite different from the potential of the vessel 10 with respect to the reference electrode in the passive range of interest. In either event, however, in accordance with the present invention, the cathode 14 is (after the polarization curve is obtained) connected directly to the controller 24 by the conductor 20, and the controller 24 is set at a control potential ($V_c$) corresponding to the center of the passive range of the vessel under consideration as measured by the applied volts between the vessel 10 and the cathode 14 during the polarization study discussed above.

In the present example, the controller 24 could be set with a $V_c$ of 1.1 volts which is well in the passive range. Therefore, at any time the actual voltage between the vessel 10 and cathode 14 varied from 1.1 volts, the controller 24 would send an error signal through the conductor 42 to vary the setting of the current supply 30 and bring the voltage between the vessel 10 and the cathode 14 back to the desired level. As a result, the proper amount of anodic current would be passed between the vessel 10 and the cathode 14 to maintain the vessel 10 in a passive condition. It will be noted that in this type of system, the reference electrode 44 is not required, except during the passivation study of the metal under consideration.

CONTROLLER AND CURRENT SUPPLY

As shown in FIG. 3, the controller 24 is best considered in three sections: a set point control 50, a control amplifier 52 and a reset amplifier 54. The set point controller comprises a battery 56 connected across a potentiometer coil 58 which has an adjustable tap 60. The input terminal 32 of the controller, which is connected to the vessel 10, is connected to the positive side of the battery 56. Thus, the battery 56, depending upon the setting of the movable tap 60 of the potentiometer 58, bucks the voltage ($V_r$) between the vessel 10 and the cathode 14. It will therefore be understood that the battery 56 and potentiometer 58 form the function of setting the control potential ($V_c$) previously mentioned. Any variation between the control potential and the reference potential ($V_r$) results in an error voltage or signal being applied to the tap 60 of the potentiometer; that is, between the tap 60 and ground.

The error voltage $V_e$ appearing between the set point controller 50 and ground is impressed on one grid of a differential amplifier 62 of the control amplifier 52 to provide a first stage of voltage amplification. The amplified output of the differential amplifier 62 is impressed on a second differential amplifier 64 to provide a second stage of voltage amplification. Both of the differential amplifiers 62 and 64 are, of course, DC amplifiers and provide voltage amplification. The output of the differential amplifier 64 controls the operation of a cathode follower 66 which provides power amplification of the error signal. It will also be noted that a feedback loop 68 extends from the output of the cathode follower 66 to the input of the differential amplifier 64 to reduce the net gain of the control amplifier 52 to maintain stability of operation.

The output of the cathode follower 66 appearing across the cathode resistor 70 may be designated as the "control signal" which is impressed on the base of a PNP transistor 72. The collector of the transistor 72 is connected to ground and the emitter of the transistor is connected by the conductor 42 to a suitable current control device, such as the control winding 74 of a saturable core reactor 76. Since the transistor 72 will conduct when the base thereof is more negative than the emitter, the amount of current flowing through the control winding 74 of the saturable core reactor 76 used to control the current will increase as the control signal goes in a negative direction and vice versa. For example, a negative error signal will decrease the positive potential of the base of the transistor 72 to increase the amount of current flowing through the control winding of the saturable core reactor, which would thus increase the power supplied to the vessel 10 and inert cathode 14.

The saturable core reactor 76 is connected to an AC power supply 78 and to a transformer 80. The output from the transformer 80 is rectified by a suitable rectifier 82 and the direct current thus developed is passed between the vessel 10 and inert cathode 14 as illustrated in FIG. 1.

The control amplifier 52 has a fast response compared with the response of the saturable core reactor 76. Thus, the gain of the control amplifier 52 must be limited to prevent "hunting" or oscillation of the saturable core reactor. In other words, the effect of rapid vibrations in the error signal would be immediately applied by the control amplifier 52 on the control winding 74 of the saturable core reactor 76; however, the saturable core reactor 76 will not respond simultaneously with such rapid variations in the error signal, and would constantly change to catch up with the changing error signal which changes would in turn provide new error signals. The reset amplifier 54 is therefore provided to obtain the desired gain only upon sustained variations in the error signal, as well as to overcome the effects of drift in the DC amplifiers included in the control amplifier 52.

The reset amplifier 54 basically comprises an AC amplifier 84 and a chopper 86. The error signal appearing at the output of the set point controller 50 is impressed on the chopper 86 by connecting the contact 60 to the stationary contact 88 of the chopper by a conductor 90, with the terminal 22 being connected to the movable contact 92 of the chopper by a conductor 94. Thus, a pulsating DC is provided in the conductor 96 connecting the conductor 94 with the amplifier 84. A condenser 98 is interposed in the conductor 96 to convert the pulsating DC to a substantially square wave AC which is in turn amplified by the amplifier 84 at a gain of, for example, 130. The square wave output of the amplifier 84 is coupled to another stationary contact 100 in the chopper 86 through a condenser 102 to convert the square wave to a pulsating DC signal which is 180° out of phase with the signal fed to the amplifier 84.

The resulting pulsating DC signal is subjected to a low pass filter comprising a resistor 104 and a condenser 106 to provide an amplified error signal in the conductor 108 having a polarity opposite to the polarity of the original error signal appearing at the output of the set point control 50. The modified error signal in conductor 108 is applied to another grid (not shown) of the differential amplifier 62 of the control amplifier 52. It will thus be seen that the output of the differential amplifier 62 comprises an amplification of the difference between the original error signal, and the modified error signal produced by the reset amplifier 54 and passed into the differential amplifier 62 via the conductor 108.

The low pass filter (resistor 104 and capacitor 106) which is used in producing the modified error signal has a relatively long time constant, such as a 0.02 cycle per second, to minimize the rate of variation of the modified error signal compared with the variations in the original error signal. In other words, the original error signal must persist at a given amplitude for an appreciable period of time before there is a change in the modified error signal produced by the reset amplifier 54. Since the modified error signal is subjected to substantially more amplification than the original error signal, the modified error signal will have a major control on the amplitude of the control signal applied to the base of the transistor 72 during sustained variations in the error signal. Variations in the original error signal of short time duration will have a minor effect on the amount of current flowing through the control winding 74 of the saturable core reactor 76 and will not cause the reactor to "hunt."

OPERATION

In the practice of the present invention, the polarization curve for the specific vessel 10 in contact with the specific corrosive electrolytic solution 12 is first obtained. As previously indicated, this is obtained through use of a reference electrode, such as the electrode 44 shown in FIG. 1 of the drawings. The current supply 30 is adjusted to provide a flow of anodic current from the vessel 10 to the inert electrode 14 and the potential difference between the vessel 10 and the reference electrode 44 is constantly monitored. The potential imposed across the vessel 10 and the cathode 14 is varied in a step-wise fashion to vary the potential of the vessel 10 in a more noble direction with respect to the potential of the reference electrode 44 to determine the variation in anodic current passed between the vessel 10 and the cathode 14 at the various potential differences to produce a polarization curve as illustrated in FIG. 2. An examination of this curve readily shows the range of potential of the vessel 10 at which the vessel is most passive to the corrosive action of the solution 12. Since the various potential differences between the vessel 10 and the cathode 14 were monitored during production of the polarization curve, these potential differences in the passive range of the vessel will also be determined.

In passivating the vessel 10 in accordance with the present invention, the set point controller 50 is first adjusted to impose a bucking voltage or control potential $V_c$ equal to the center of the passive range of potential difference between the vessel 10 and the cathode 14 as determined from the polarization curve as described in detail above. For example, in the embodiment disclosed in Table I herein, the set point controller 50 would be set to provide a control potential of 1100 mv. It will thus be seen that any time the voltage $V_r$ between the vessel 10 and the inert cathode 14 varies from the set point or control potential $V_c$ of the set point controller 50, an error voltage will be produced between the tap 60 of the set point controller potentiometer 58 and ground. Such error voltage will be amplified by the control amplifier 52, as controlled by the reset amplifier 54, to provide a control signal on the control winding 74 of the saturable core reactor 76. The saturable core reactor will therefore in turn control the output of the rectifier 82 and bring the potential difference between the vessel 10 and the cathode 14 back to the control potential $V_c$. Thus, the vessel 10 will be retained in the passive range and the corrosion of the vessel will be at a minimum.

From the foregoing it will be apparent that the present invention provides a method and apparatus for minimizing the corrosion of a metal in contact with a corrosive electrolytic solution, without the necessity of the use of a reference electrode, except when obtaining the polarization curve. When anodically passivating a vessel containing a corrosive electrolytic solution, the elimination of the use of a reference electrode substantially reduces the cost of the installation and reduces the number of openings in the vessel. An inert electrode is immersed in the solution and provides a dual function of a reference electrode and a cathode for the polarization operation. The invention is particularly useful in protecting vessels against highly corrosive liquids, since the usual reference electrodes have a short life in highly corrosive liquids and normally can not provide a satisfactory reference EMF signal.

Changes may be made in the combination and arrangement of parts or elements, as well as in the steps and procedures, heretofore set forth in the specification and shown in the drawings without departing from the spirit and scope of the invention as defined in the following claims.

We claim:
1. Apparatus for minimizing corrosion of a metal vessel containing a corrosive, electrolytic solution, comprising:
   an inert cathode electrically communicating with the solution;
   a source of DC including a saturable case reactor connected to the vessel and the cathode for passing an anodic current between the vessel and the cathode;
   means for measuring the range of difference in potential between the vessel and the cathode at which the vessel is most passive; and
   a controller connected to the vessel and the cathode for monitoring the difference in potential between the vessel and the cathode, and connected to the DC source for controlling the potential difference between the vessel and the cathode to within said range, said controller comprising:
      a battery and a potentiometer connected in series and to the vessel to provide a control potential in said range in opposition to the difference in potential between the vessel and the cathode, said potentiometer having a tap thereon on which is imposed the difference between said control potential and the potential difference between the vessel and the cathode, and
      a DC amplifier connected to said potentiometer tap and having its output connected to the control winding of said saturable core reactor.

References Cited

UNITED STATES PATENTS

| | | | |
|---|---|---|---|
| 3,061,773 | 10/1962 | Ellison et al. | 204—196 |
| 3,143,670 | 8/1964 | Husock | 204—196 |
| 3,197,755 | 7/1965 | Conger | 204—196 |
| 3,258,612 | 6/1966 | Rubelmann | 204—196 |
| 3,280,020 | 10/1966 | Conger | 204—196 |
| 3,317,415 | 5/1967 | Delahunt | 204—196 |

OTHER REFERENCES

Sudbury et al., "Corrosion," vol. 16 No. 2, February 1960, pp. 47t–54t. NRL Memorandum Report No. 131, March 1953, pp. 1–10.

HOWARD S. WILLIAMS, *Primary Examiner.*

JOHN H. MACK, *Examiner.*

T. TUNG, *Assistant Examiner.*